July 7, 1936.  W. D. RAMAGE  2,046,411
PROCESS OF SUBSTITUTION CHLORINATION
Filed Sept. 17, 1934
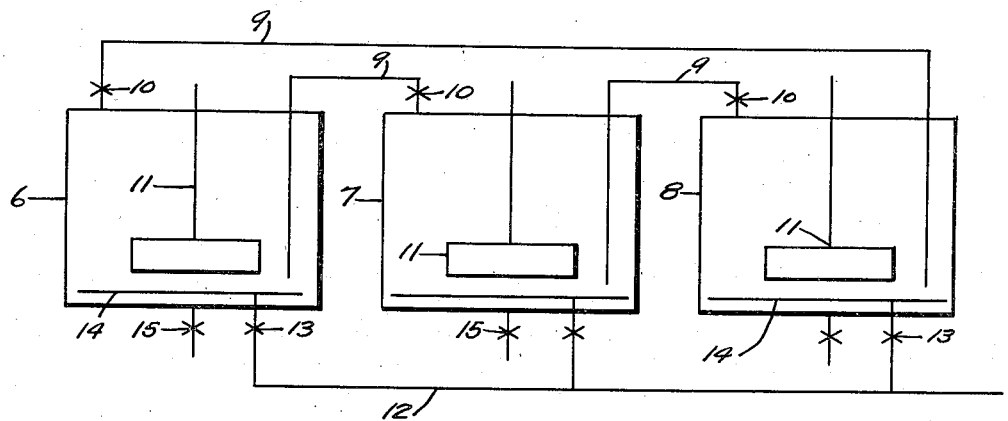
INVENTOR
WILLIAM D. RAMAGE
BY
ATTORNEY Patented July 7, 1936

2,046,411

UNITED STATES PATENT OFFICE 2,046,411

PROCESS OF SUBSTITUTION CHLORINATION

William D. Ramage, Pittsburg, Calif., assignor to Great Western Electro-Chemical Company, a corporation of California Application September 17, 1934, Serial No. 744,389

22 Claims. (Cl. 260—161)

This invention relates to the substitution chlorination of organic compounds, particularly hydrocarbons, although it is of a generic character and applicable to the substitution of chlorine for hydrogen in organic compounds generally.

The invention relates primarily to the use of hypochlorous acid or chlorine monoxide as the chlorinating agent. More specifically, it relates to the in situ use of hypochlorous acid or its anhydrid, chlorine monoxide, or in other words to the use of nascent hypochlorous acid or chlorine monoxide. The invention deals especially with the means of generation and application of the chlorinating agent, but is not limited to this phase of the chlorination.

The invention is not concerned with addition chlorination (or chlorination of unsaturated compounds), and has no connection with the numerous patents covering the use of hypochlorous acid in the manufacture of chlorhydrins and similar compounds.

In attempting the manufacture of para-dichlorbenzene, the classical method was used of direct chlorination at an elevated temperature in the presence of a metal chloride catalyst as aluminum or ferric chloride. This was only moderately successful in that a mixture of mono-, di-, and trichlor benzenes was secured. In addition, the HCl evolved carried off some benzene; to render the process economically feasible, these must be recovered. To avoid losses, chlorination had to be discontinued short of complete conversion of the mono- to dichlor to avoid the formation of too much trichlor benzene from the dichlor. In order to avoid these difficulties, an attempt was made to develop a chlorination method not involving the generation of hydrochloric acid. The findings of a previous investigation on chlorination of nitrobodies, particularly relating to the manufacture of chlorpicrin from nitromethane (copending application Number 619,354, U. S. Patent No. 1,996,388) were utilized to this end.

I have determined that direct substitution chlorination of organic compounds can be effected advantageously and without formation of HCl by the use of chlorine in the presence of those metal oxides easily reduced by carbon at elevated temperatures and which oxides are not too alkaline. In this connection I have found that the process can be carried out in either an aqueous or a substantially anhydrous medium. Thus, I have chlorinated benzene by suspending therein a finely divided metal oxide such as zinc oxide and passing in chlorine gas while vigorously agitating the mixture to keep the oxide in suspension and secure good contact. Adding a diluent, as carbon tetrachloride, increases the effectiveness of the contact. The chloride formed is very hygroscopic so that the mass remains substantially anhydrous.

Depending upon the relative amounts of benzene and zinc oxide, zinc oxychloride may be formed. At the end of the chlorination, hydrochloric acid solution may be added to complete the conversion of oxychloride to chloride, and the strong metal chloride solution may then be drawn off from the chlorinated material.

I believe it probable that the effective chlorinating agent is hypochlorous acid or its anhydrid, chlorine monoxide. In the case of aqueous conditions, this reaction can be written:

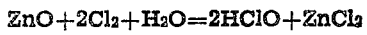

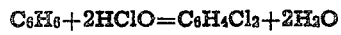

while under anhydrous conditions:

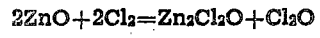

In either case, the reaction between the nascent hypochlorous acid (or chlorine monoxide) and the material to be chlorinated is so rapid that no considerable concentration of HClO or Cl$_2$O is present at any one time. The value of hypochlorous acid and chlorine monoxide as substitution chlorination agents has not been recognized previously because of the difficulty of control and the danger of explosion in the case where large preliminary concentrations of Cl$_2$O are allowed to be present. Furthermore, the exact control of conditions (e. g. pH) favorable to this type of chlorination has not been determined heretofore, because it has not been realized that exact control of the reaction is possible.

It will be noted that water is formed from the hydrogen which is displaced by chlorine. Under anhydrous conditions, this water is taken up by the metal chloride, but whether or not this is rapid enough to avoid hydrolysis of the anhydrid, I have not determined. In any case, the chlorinating agent generated is very vigorous and I am able to chlorinate materials to produce compounds which cannot be secured by chlorination with chlorine alone, nor with Cl$_2$ plus catalysts at the temperature used. Under aqueous conditions, the water formed has no effect on the reaction, and hypochlorous acid is probably the active chlorinating agent although I am not sure. In any event, the operation contemplated is such that water is never present in an amount greater than that which will be taken up due to the hygroscopic nature of the metal chlorides formed. Thus, water present initially (see the second equation) does not increase in volume for part is taken up by the chloride and part by the reaction. As to whether or not this dehydration occurs with a rapidity sufficient to avoid hydrolysis I can not say definitely and it may be that part of the action is due to formation of the hydrated chlorine monoxide hypochlorous acid. Most satisfactory operation under aqueous conditions is only obtained when the material to be chlorinated is water soluble or miscible with water.

The metal oxides used are slightly basic and in aqueous medium the chlorination usually therefore occurs at a pH between 5.0 and 8.0. Below pH 5.0, the reaction is uncertain and hard to control. The process of this invention is thus readily distinguished from that disclosed in Townsend 1,468,220 wherein HCl is present. Under the conditions existing in Townsend's scrubber I have found that no chlorination occurs of the type claimed herein. The presence of hydrochloric acid automatically prevents the formation of hypochlorous acid, since hydrolysis of the chlorine is prevented. Townsend deals only with aqueous conditions, and by his own statement (page 3, line 7) finds that "no further material chlorination of the benzol occurs in the scrubber when aqueous suspensions of zinc oxide are used". The chlorination which does take place is obviously due to the chlorine present, since only monochlorbenzene is formed. Chlorine alone will give this result, while a more vigorous chlorinating agent is necessary to obtain the higher chlorinated derivatives.

While chlorine monoxide can be generated by passing chlorine over mercuric oxide, I prefer to use other metal oxides because of their cheapness, equal efficiency, and greater safety. It has not been previously recognized that other oxides than HgO act in this manner. The reason for this is, I believe, that the equilibrium concentration of chlorine monoxide obtained from these other oxides in the presence of chlorine is so small that the reaction does not proceed appreciably unless there is present some substance capable of being chlorinated by the chlorine monoxide (or hypochlorous acid) thus displacing the equilibrium in the desired direction. I prefer to use zinc oxide, a ferric oxide or manganese dioxide. Calcium oxide, magnesium oxide, and other strongly alkaline oxides do not function in the manner described which proves that the action described is not mere absorption of generated HCl. The preferred oxides are very weakly basic and they form unstable hypochlorites. Compounds other than the oxide can be used, for example, the carbonates. This is not as desirable since $CO_2$ is given off, thus eliminating one of the advantages of the process. It can be considered that an element of the invention is in the discovery of functional equivalents for mercuric oxide, materials rendering the process commercially practical.

It should be noted that the metal oxide, as used in this process, is not a catalyst. It is actually one of the reactants and is always present in at least a stoichiometric proportion. The oxide may, of course, be fed in as the reaction proceeds, so that the excess of oxide present at any time may be relatively slight. Better rsults are generally secured, however, when a substantial excess of oxide is used.

The process can be made continuous by feeding in a regulated stream of the oxide and organic body while a regulated stream of metal chloride and chlorinated body are withdrawn, the whole body being actively agitated. The organic body chlorinated is in general kept in the liquid phase during the reaction, particularly when the reaction mixture is substantially water free. When the oxide is suspended in water or in an inert diluent such as $CCl_4$, the organic body can be introduced as gas or vapor, if it is soluble in water or in the diluent.

The process is also applicable to gas phase reactions. A mixture of methane and chlorine may, for example, be passed through a tower filled with zinc oxide (or iron oxide). Temperature control may be secured by passing zinc chloride (or ferric chloride) solution down through the tower as the reacting gases pass upward. Fresh oxide is fed in at the top of the tower and the chlorinated derivatives pass off to a condenser.

It is in general the object of the present invention to provide an improved substitution chorination process for organic compounds.

Another object is to provide a process for the substitution chlorination of organic compounds without generation of hydrochloric acid or other gaseous product.

Another object is to provide a process for the manufacture of dichlorbenzenes, particularly the para.

A further object is to provide a process for substitution chlorination with hypochlorous acid or its anydrid produced in direct and immediate contact with the material to be chlorinated.

Another object is to provide a chlorination process for substitution chlorination under only moderately alkaline or acid conditions.

A further object is to provide for substitution chlorination with hypochlorous acid or its anhydrid under such conditions that no dangerous concentration of hypochlorous acid or chlorine monoxide is present at any time.

Other objects will appear in the following wherein I have outlined certain chlorination substitutions by way of example and not by way of limitation, inasmuch as the invention is applicable to substitution chlorination of organic materials generally.

The single figure in the drawing is a diagram of apparatus suitable for application of the invention in the liquid phase.

In chlorinating, I use an apparatus such as that shown in the drawing. A series of vessels 6, 7 and 8 which can be cooled (usually below 100° C. and about 40° C.), are interconnected by vapor lines 9 having valves 10 therein. Each vessel has agitation means therein as agitator 11. A chlorine line 12, with valves 13, supplies chlorine to a distributor 14 in each vessel. In operation, two vessels, say 6 and 7, are charged with the material, either anhydrous, with a diluent, or with water present, and the oxide and the vessels closed. The connecting vapor line is opened and chlorine introduced into vessel 6 while both agitators are operated. The vapor line carries unused chlorine (not hydrochloric acid) over into the next vessel where it reacts. When the charge in vessel 6 is chlorinated to the degree desired, vessel 8 is connected to vessel 7 and its agitator operated, whereupon the chlorine is introduced into vessel 7 after the vapor line to vessel 6 is closed; drawoff 15 permits removal of products. In this way chlorine and vapor losses are prevented while continuous operation is secured. Note that no HCl is given off and that the chlorine which passes from one vessel to the next is merely that portion which has bubbled through the reaction mixture without making contact. When the chlorine rate and other conditions are properly controlled, the chlorine reacts completely in the first reaction vessel. The connection to the second vessel acts merely as a safeguard against unexpected changes in operating conditions, such as a sudden increase in the chlorine rate.

In the case of benzene, the treatment, after chlorination, is as follows:

After drawing off the contents of one of the vessels and separating the metal chloride solution, the chlorinated benzene is washed with water and with dilute caustic and is then subjected to fractional distillation, either with or without steam. Sharper cuts are obtained if a high vacuum is not used. Any unconverted benzene or monochlorbenzene is returned to the process. The next higher boiling fraction which contains the mixed dichlor derivatives is further treated as described below.

The trichlor fraction or high boiling residue has no value at the present time. It is not advisable, therefore, to attempt complete conversion of the monochlor to dichlor. The danger of trichlor formation is, however, somewhat less in this method than in the usual method, and if the chlorination is not carried beyond 80% completion, the amount of trichlor corresponds to less than 5% of the total chlorine.

Recovery and purification of the paradichlor is effected as follows. The dichlor fraction is mixed with strong salt solution, chilled to about minus 10° C. and the paradichlor-benzene filtered out. This is pressed to a solid cake as rapidly as possible and then washed with successive portions of water, starting with water at 0° and gradually warming the wash water to approximately 40° C. (More effective washing is secured by repulping the para in the wash water, but very good results have been obtained without repulping.) This removes the last trace of ortho mother liquor from the paradichlor. The ortho-dichlor which passes through the filter with the brine is ready for stock after separation of the water. The washings, however, are treated separately because of their relatively high content of paradichlor. The dichlorbenzene which separates from the wash waters is returned to the next batch, preferably ahead of the distillation, since some trichlor may be present as an impurity. In this way, the maximum recovery of paradichlor is obtained and the ortho-dichlor suffers a minimum amount of contamination with para.

After separating the water, the ortho-dichlorbenzene is further dried by means of drying agents (e. g., by passing it through a CaCl₂ tower) or by warming for a short time under vacuum. The para is dried in the same manner, being kept above its melting point during the treatment. After drying, the para is allowed to solidify and then broken up and graded. The fines may be sold as such or remelted.

According to another method I proceed as follows. The dichlor fraction is chilled under agitation until completely crystallized, preferably below minus 10° C. The crystal mass is then centrifuged, the temperature being made to rise gradually during this operation by blowing a stream of air through the crystal layer. The liquid which separates from the crystals below minus 10° C. is largely ortho dichlorbenzene. The mother liquor separating at higher temperatures contains sufficient para so that it must be returned to a subsequent batch, preferably ahead of the distillation, since some trichlor may be present as an impurity. The final temperature of the air blast is close to the melting point of paradichlorbenzene, and the para thus obtained is sufficiently pure for a commercial product. Removal of the last traces of ortho can be effected by a remelting and recrystallizing operation.

The chlorination process set forth, I have found, gives the largest yield of paradichlorbenzene, local over-chlorination being avoided, particularly if an excess of orthodichlorbenzene is present initially. When a high yield of paradichlorbenzene is desired, a mixture of benzene and orthodichlorbenzene should be used, a proportion of about three to one being satisfactory when chlorinated with chlorine in the presence of metal oxide. The dichlor benzenes are not produced when benzene and chlorine are brought into contact even in the presence of water and also even when lime is added. Homologues of benzene and derivatives thereof can be used in place of benzene to secure chlorine substituted bodies.

The invention is of a generic character and the mention of benzene is only by way of example and not by way of limitation. The invention is applicable to the substitution of chlorine generally and the material treated can be whatever material is desired to be subjected to operation of the process, whether it be an aliphatic or an aromatic compound, and whether the chlorination be directly in a straight chain, a branch chain, a side chain, or in a cyclic or a ring compound (whether heterocyclic or carbo-cyclic). The materials subject to the successful use of the process are numerous and I have successfully chlorinated such different materials as aromatic nitro bodies of which picric acid is mentioned, aliphatic nitro bodies and of which nitromethane, nitroethane, et cetera, are mentioned, as well as other primary, secondary, and tertiary nitroparaffines, organic acids, e. g., acetic acid. Limitation as to the materials to which the process is applicable is not intended; any material subject to chlorination under conditions of the process can be used.

I claim:

1. Chlorinating a saturated organic compound by substituting chlorine therein by the action of chlorine in the presence of a metal oxide of the class consisting of zinc, ferric, and manganese under substantially anhydrous conditions.

2. A substitution chlorination process comprising introducing free chlorine into contact with a liquid saturated organic compound and a non-alkaline metal oxide easily reduced by carbon at an elevated temperature under substantially anhydrous conditions.

3. A substitution chlorination process comprising introducing free chlorine into contact with a liquid saturated organic compound and a non-alkaline metal oxide easily reduced by carbon at an elevated temperature while agitating the compound and oxide in a substantially non-aqueous liquid.

4. A substitution chlorination process comprising introducing free chlorine into contact with a substantially anhydrous liquid saturated organic compound and a non-alkaline metal oxide easily reduced by carbon at an elevated temperature.

5. A chlorination process comprising chlorinating with chlorine in the presence of a metal oxide of the class of zinc, iron and manganese a mixture of benzene and orthodichlorbenzene to produce paradichlorbenzene.

6. The method of producing chlorine substitution products of organic bodies which consists in mechanically suspending in the organic body a metal oxide of the class of zinc, ferric and manganese while supplying free chlorine to said suspension.

7. The method of producing chlorine substitution products of organic bodies capable of yielding a chlorine substitution product which consists in chlorinating said body in the presence of a reactive metal oxide forming thereby a chlorine substitution product and a hygroscopic chlorinated product of said metal oxide taking up substantially any water present.

8. The method of producing chlorine substitution products of organic bodies capable of yielding a chlorine substitution product which consists of chlorinating said body in the presence of a reactive metal oxide of the class of zinc, iron and manganese forming thereby a chlorine substitution product and a hygroscopic chlorinated product of said metal oxide taking up water produced in the reaction.

9. A process comprising passing a mixture of chlorine and a saturated organic compound in the gas phase over a reactive and non-catalytic metal oxide of the class of zinc, iron and manganese under substantially anhydrous conditions.

10. Chlorinating a saturated organic compound with chlorine monoxide generated in direct contact with said compound.

11. The process of chlorine substitution in a saturated organic liquid which comprises adding chlorine to a suspension in said liquid of a metal oxide of the class of zinc, iron and manganese thereby forming a hygroscopic metal chloride taking up water formed as a result of chlorine substitution in said liquid.

12. The process of chlorine substitution which comprises reacting chlorine with a saturated organic compound and in the presence of a metal oxide of the class of zinc, iron and manganese thereby forming a hygroscopic chloride and in the absence of a quantity of water more than sufficient to satisfy the hygroscopicity of said chloride.

13. A chlorination process comprising substituting chlorine in an organic body by the action of chlorine monoxide generated in direct contact with said body.

14. A chlorination process comprising substituting chlorine in an organic body by the action of chlorine monoxide generated in direct contact with said body by reacting chlorine with a metal oxide of the class of zinc, iron and manganese in the presence of said body and in the absence of water sufficient to produce any substantial hydrolysis.

15. A substitution chlorination process for an organic compound comprising reacting in stoichiometric amounts chlorine; a metal oxide of the class of zinc, iron and manganese; water and the organic compound to be chlorinated.

16. A substitution chlorination process for an organic compound comprising reacting in stoichiometric amounts chlorine; a metal oxide of the class of zinc, iron and manganese; water and a mixture benzene and ortho-dichlorbenzene.

17. A substitution chlorination process for an organic compound comprising reacting in stoichiometric amounts chlorine; a metal oxide of the class of zinc, iron and manganese; water and a mixture benzene and ortho-dichlorbenzene in the proportions of about 3 to 1.

18. A chlorination process comprising substituting chlorine under substantially anhydrous conditions in a saturated organic compound by passing chlorine into contact with said compound and a weakly basic oxide of a metal forming an unstable hypochlorite.

19. A chlorination process comprising substituting chlorine under substantially anhydrous conditions in a saturated organic compound by passing chlorine into contact with said compound and a weakly basic oxide of a metal forming an unstable hypochlorite in the presence of water.

20. A chlorination process comprising chlorinating with chlorine in the presence of a metal oxide of the class of zinc, manganese and ferric oxide a mixture of benzene and ortho-dichlorbenzene wherein said benzene and said dichlorbenzene are in the proportions of about 3 to 1 to produce a high yield of para-dichlorbenzene.

21. A chlorination process comprising chlorinating with chlorine in the presence of a metal oxide of the class of zinc, manganese and ferric oxide a mixture of benzene and ortho-dichlorbenzene to produce para-dichlorbenzene therein, chilling said mixture to solidify dichlorbenzenes, separating solid dichlorbenzene, raising the temperature of said separated dichlorbenzene to liquefy ortho-dichlorbenzene without liquefying substantially para-dichlorbenzene, and removing said ortho-dichlorbenzene.

22. A chlorination process comprising chlorinating with chlorine in the presence of a metal oxide of the class of zinc, manganese and ferric oxide a mixture of benzene and ortho-dichlorbenzene to produce para-dichlorbenzene therein, and recovering said para-dichlorbenzene.

WILLIAM D. RAMAGE.